UNITED STATES PATENT OFFICE.

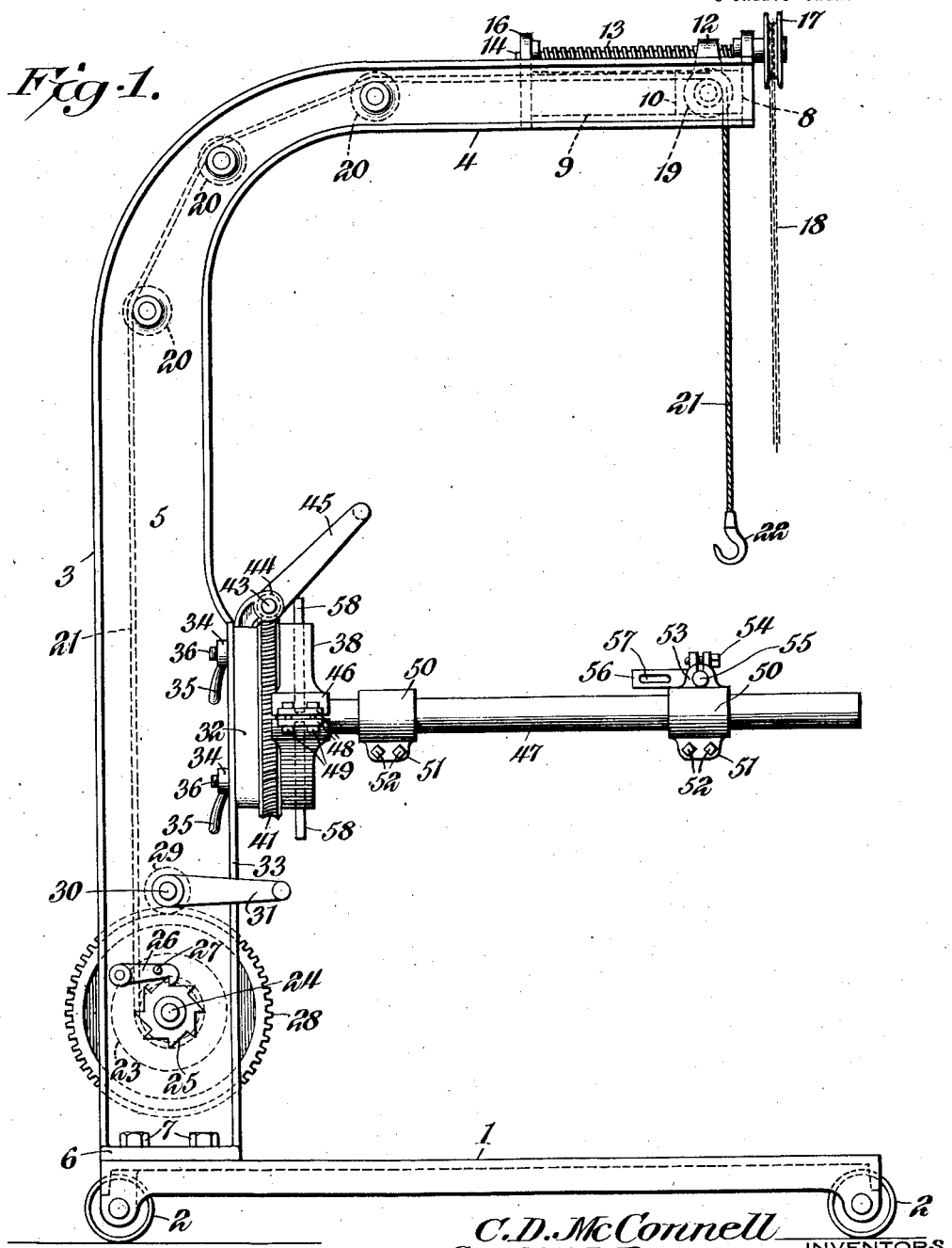

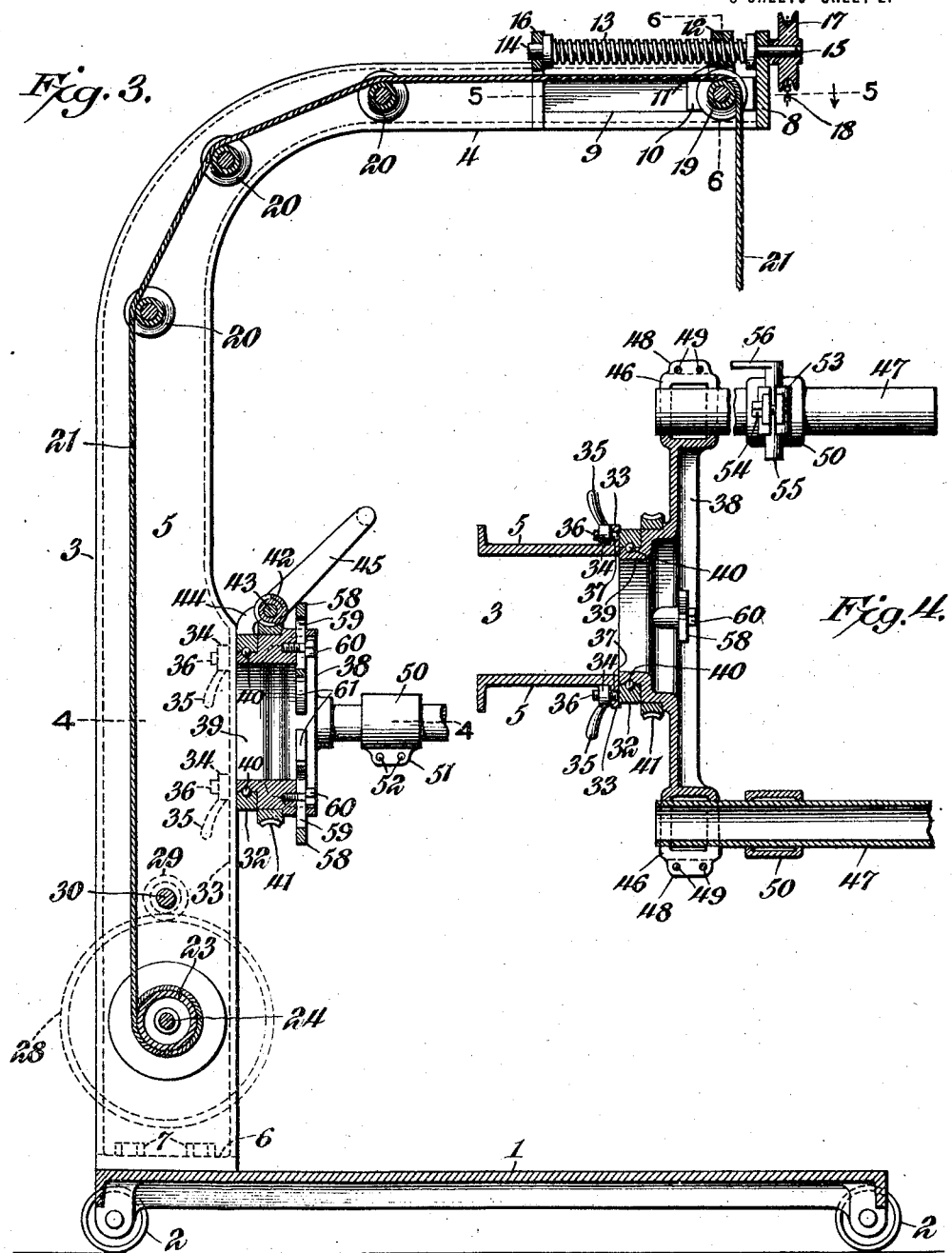

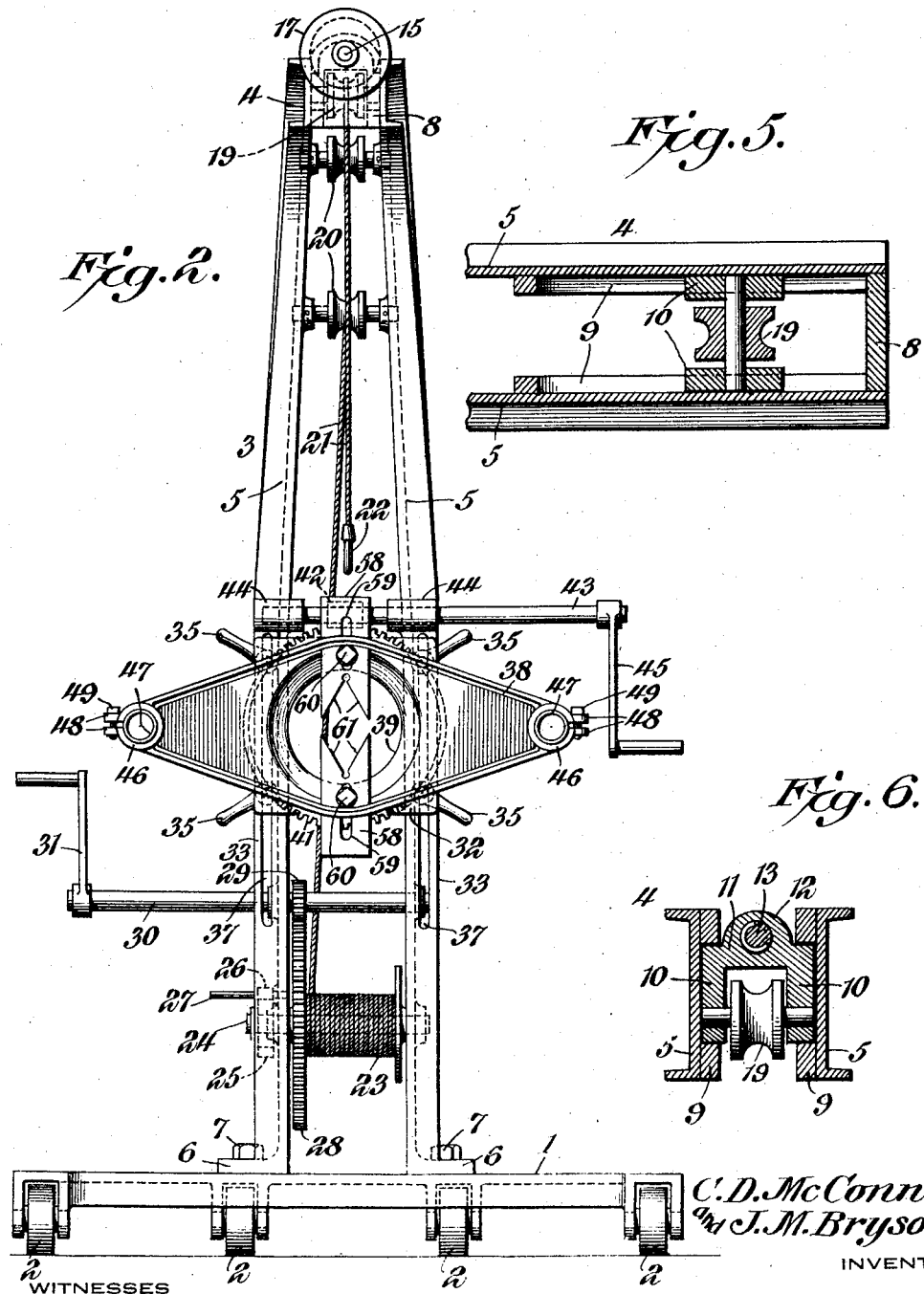

CHARLES D. McCONNELL AND JOHN M. BRYSON, OF OSKALOOSA, IOWA.

MOTOR-HANDLING MACHINE.

1,331,938.   Specification of Letters Patent.   Patented Feb. 24, 1920.

Application filed July 18, 1918. Serial No. 245,514.

*To all whom it may concern:*

Be it known that we, CHARLES D. MCCONNELL and JOHN M. BRYSON, citizens of the United States, residing at Oskaloosa, in the county of Mahaska and State of Iowa, have invented a new and useful Motor-Handling Machine, of which the following is a specification.

This invention has reference to motor handling machines, and its object is to provide a machine whereby motors and especially the explosion engines of automobiles may be expeditiously placed in or removed from the automobiles.

In accordance with the invention, there is provided a truck of such form as to be readily moved under the chassis of an automobile and on the truck there is erected a crane carrying a motor support so constructed that, when the motor is on the support, such motor may be turned to various positions, while the crane is so arranged that the motor may be carried solely thereby, independent of the motor support, and accurately positioned with respect to the chassis when it is desired to set the motor therein. The whole structure is designed with a view of simplicity of construction and facility of operation.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a side elevation of the motor handling machine.

Fig. 2 is an end elevation of such machine as viewed from the right hand side of Fig. 1.

Fig. 3 is a vertical central section, with some parts omitted, of the machine.

Fig. 4 is a section on the line 4—4 of Fig. 3, some parts being shown in elevation.

Fig. 5 is a section on the line 5—5 of Fig. 3.

Fig. 6 is a section on the line 6—6 of Fig. 3.

Referring to the drawings, there is shown a basic member or truck 1 provided with supporting wheels 2, and the basic member is of such size and so proportioned that it may be moved under the chassis of an automobile to bring certain parts carried by the truck into operative relation to the explosion engine of the automobile if already installed or to permit placing the engine on the chassis for installation.

Erected on one end of the truck 1 midway between the sides thereof is a post 3 terminating at the upper end in an arm 4 overhanging the truck 1. The arm 4 may be of an extent from the post 3 to overhang the truck 1 into close approach to the opposite end thereof.

The post 3 is shown as a duplex structure consisting of two channel members 5 separated by an appropriate distance for a portion of the height of the post and then approaching each other and merging into the arm 4. The channel members 5 are each provided with a foot 6 at the lower end secured to the truck 1 by cap screws 7 or in any other appropriate manner. The extremities of those parts of the channel members 5 constituting the arm 4 are joined by a cross-piece 8 uniting and spacing the outer end of the arm.

The structure of the post 3 and arm 4, which together may be termed a crane, may be otherwise constructed and arranged than has been described, but the arrangement shown is practical and has advantages.

The inner faces of the members 5 of the crane, adjacent to the outer end of the arm 4 are provided with runways 9 lengthwise of the arm and in these runways are seated legs 10 of an arch block 11 having an intermediate enlargement 12 at its crown portion threaded for the reception of a propelling screw 13. At the ends of the screw 13 are pintles 14 and 15 respectively. The pintle 14 is mounted in a journal bearing in a cross-piece 16 at one end of the runways 9, while the pintle 15 is journaled in the cross-piece 8 which is made high enough for the purpose. Fast to the pintle 15 is a pulley 17 carrying a manipulating chain or strand 18.

Mounted in the arch block 11 is a pulley 19 and mounted at intervals in the junction between the post 3 and arm 4, which junction is curved, is a series of pulleys 20. Passed over the pulley 19 and dropping down toward the truck 1 is a cable or rope 21 terminating in a hook 22 or other carrying means. The rope 21 is carried along between the side members 5 of the arm 4 and post 3, being guided by the pulleys 20 about the curved junction of the arm and post and downwardly through the post to a winding drum 23, fast on a shaft 24 journaled in the two side members of the post 3 and provided with an extension through one of the side members and there carrying a ratchet wheel 25. Pivoted to the side member 5 adjacent to the ratchet 25 is a pawl 26 so situated as to engage anyone of the teeth of the ratchet 25. A handle which may be in the form of a pin 27 projects from the pawl in such manner as to facilitate the lifting of the pawl, which may be a gravity pawl, when it is desired to release the ratchet from the pawl.

Fast on the shaft 24 is a gear wheel 28 and this gear wheel may be located between the side members 5. Meshing with the gear wheel 28 is a pinion 29 on a crank shaft 30 journaled in the side members 5 and extending through one of them and provided with a manipulating crank 31. By this arrangement a load carried by the hook 22 and cable 21 may be readily lifted by actuating the drum 23 and held in any suitable position by the engagement of the pawl 26 with a tooth of the ratchet 25, or by releasing the ratchet from the pawl 26 the load may be lowered as desired.

Fast to the post 3 about midway of the height of the post on the side thereof toward the other end of the truck 1 is a frame 32, being held to flange portions 33 of the members 5 by clamp nuts 34 each provided with a manipulating handle 35 facilitating adjustment. The nuts 34 are applied to bolts or threaded stems 36 carried by the frame 32 and projecting through slots 37 in the webs of the channels 5 where the frame 32 is applied. These slots are elongated lengthwise of the channel webs or flanges so as to permit an up and down adjustment of the frame 32, the frame being clamped in the adjusted positions by tightening the nuts 34.

There is also provided a bed rail frame comprising a double ended rocker arm 38 which may be a casting of web and flange construction alike on both sides of a central hollow neck 39 carried by and capable of rocking in the frame 32. Where the frame 32 receives the neck 39 are matching ball races in which are lodged a series of antifriction balls 40, it being understood, of course, that rollers may be substituted for the balls. Fast to the frame 38 on the side of the neck 39 remote from the post 3 is a worm gear wheel 41 in mesh with which is a worm 42 fast on a crank shaft 43 mounted in journal bearings 44 on the frame 32 and provided at one end with a crank 45 by means of which the crank shaft may be manipulated and the bed rail frame rocked to any extent desired or even inverted or completely rotated.

The rock arm 38 at its extremities has clamps or receptacles 46 for the ends of bed rails 47, the clamps being split and provided with matching ears 48 with each pair of ears traversed by a clamp bolt 49.

Mounted on the rails 47 are sleeves 50 which may be split at one side and there formed in matching ears 51 traversed by clamping bolts 52 whereby the clamps may be loosened for adjustment and tightly secured to the rails 47. Each clamp sleeve 50 at a point which may be opposite the ears 51 is provided with other ears 53 traversed by a clamp bolt 54. The ears carry between them a rod 55 having an angle extremity 56 provided with a longitudinal slot 57.

At the mid-point of the arm 38 on diametrically opposite sides, these being the upper and lower sides, there are mounted slides 58 each with a longitudinal slot 59 therein traversed by a set screw 60 threaded into the arm 38 so that the slide may be adjusted up and down and clamped in the adjusted position. The inner ends of the two slides are each reversely tapered to form a V-shaped notch 61, whereby the slides when properly adjusted may grasp and center a structure put between them.

Let it be assumed that the parts are in the position shown in Figs. 1, 2 and 3 and that it is desired to remove an engine from the chassis of an automobile. The motor handling machine is moved up to the front of the automobile close enough so that the truck 1, or the greater part of the platform thereof, is moved under the chassis between the front wheels, it being assumed, of course, that the automobile is sufficiently dismantled to permit the removal of the engine from the frame.

On loosening the bolts holding the motor to the chassis and by connecting the rope or cable 21 to the motor, the latter may be lifted from the chassis by properly operating the windlass, and the motor may then be made fast to the bed rail frame, after which the truck may be moved away from the automobile chassis to a convenient place for working upon the engine. While the motor is still sustained by the rope or cable 21, the bed rail frame may be adjusted to receive and secure the motor.

When the truck carrying the engine has been placed in convenient position for working on the engine the latter may be turned to any desired extent by manipulating the crank shaft 43, this greatly facilitating the dismantling of the engine to the extent required and the reassembling of the engine.

When it is desired to replace the engine on the chassis or to install a new engine, such engine is mounted on the bed rail frame with the latter adjusted high enough to permit the truck to be moved under the chassis, after which, the engine is lowered by means of the windlass structure in position on the chassis. To facilitate the placing of the engine the adjusting mechanism on top of the arm 4 of the crane is utilized, such mechanism permitting to and fro movement of the engine when disconnected from the bed rail frame and supported solely by the rope or cable 21. As soon as the engine is properly placed on the chassis the truck as a whole may be moved out of the way and the engine may then be secured in place in the usual manner.

The whole structure has the advantage of great flexibility of manipulation, permitting the removal of the engine from the chassis and replacing the engine thereon and extreme mobility with respect to turning the engine about its longitudinal axis to varying extents as may be required in repair work.

What is claimed is:—

1. A motor handling machine comprising a portable support, a crane erected thereon, and a bed rail frame on the crane for receiving and carrying a motor initially engaged by the crane.

2. A motor handling machine comprising a support, a crane structure thereon for engaging and lifting the motor, and carrying means on the support to which the motor may be attached after being lifted by the crane.

3. A motor handling machine comprising a crane structure, with means for lifting or lowering the engine, and another structure associated with the crane structure to which the engine may be secured.

4. A motor handling machine comprising a crane structure, with means for lifting or lowering the engine, and another structure associated with the crane structure to which the engine may be secured, said second named structure having means for rotating it.

5. A motor handling machine comprising a portable support, a crane erected thereon and having means for lifting and lowering the engine, and carrying means for the engine having means for turning the engine about an axis longitudinal thereof.

6. A motor handling machine comprising a portable support, a crane erected on the support near one end of and overhanging the support, and having means for engaging and lifting and lowering the engine, and an engine-receiving structure carried by the crane and provided with means for turning the structure about an axis longitudinal thereof.

7. A motor handling machine comprising a truck, a crane structure erected thereon and overhanging the truck for lifting and lowering the engine, and a support for the engine mounted on the crane intermediate of the height thereof in overhanging relation to the truck and provided with means for imparting rotative movements to the engine support.

8. A handling machine for automobile motors, comprising a truck adapted to be moved under an automobile chassis, a crane erected on the truck near one end of and overhanging the truck and provided with means for engaging and lifting the engine with respect to the chassis, and a support for the engine carried by the crane intermediately of the height thereof.

9. A handling machine for automobile motors, comprising a truck adapted to be moved under an automobile chassis, a crane erected on the truck near one end of and overhanging the truck and provided with means for engaging and lifting and lowering the engine with respect to the chassis, and a support for the engine carried by the crane intermediately of the height thereof, said support having means for imparting rotative movements thereto on a line perpendicular to the height of the crane.

10. A handling machine for automobile motors, comprising a truck adapted to be moved under an automobile chassis, a crane erected on the truck near one end of and overhanging the truck and provided with means for engaging and lifting and lowering the engine with respect to the chassis, and a support for the engine carried by the crane intermediately of the height thereof, said support having means for imparting rotative movements thereto on a line perpendicular to the height of the crane, and said support and crane having coacting parts for permitting variations in the height of and securing the support to the crane in adjusted positions.

11. A machine for handling automobile motors, comprising a truck of a height to be moved beneath the chassis of the automobile under the engine, a crane erected on the truck near one end of the latter and provided with an arm overhanging the truck, means on the crane for lifting and lowering an engine engaged thereby, an engine support on the crane intermediate of the height thereof and projecting over the truck, and means for imparting rotative movements to the engine support.

12. A machine for handling automobile motors, comprising a truck of a height to be moved beneath the chassis of the automobile under the engine, a crane erected on the truck near one end of the latter provided with an arm overhanging the truck, means on the crane for lifting and lowering an engine engaged thereby, an engine support on the crane intermediate of the height thereof and projecting over the truck, and means for imparting rotative movements to the engine support, said crane having means for imparting movements to an engine carried thereby in the direction of the length of the arm.

13. In a motor handling machine, a truck, a post erected on the truck near one end thereof and provided with an arm overhanging the truck toward the other end thereof, and means on the arm for moving a load carried thereby toward and from the free end thereof, comprising a pulley, for hoisting mechanism on the outer end, and mounted to move bodily lengthwise of the overhanging arm, a feed screw on the arm connected to the pulley for moving the latter lengthwise of said arm, said feed screw extending beyond the free end of the arm, a pulley fast to the feed screw at the outer end thereof, and a flexible strand engaging and actuating the pulley and dropping to accessible position beyond the outer end of the arm, whereby an operator manipulating the feed screw is located in position to observe the settling of the load into place because of close approximation to the load.

14. In a motor handling machine, a bed rail frame for carrying motors, comprising a double-ended rocker arm, substantially parallel rails each fast at one end to and projecting from the rocker arm to thereby provide a frame with the end remote from the rocker arm open, and means for rotating the bed rail frame about its longitudinal axis.

15. In a motor handling machine, a bed rail frame for carrying a motor, comprising a double-ended rocker arm, substantially parallel rails each fast at one end to and carried by the rocker arm, thereby providing a frame with the end remote from the rocker arm open, carrying devices for the motor adjustable on the rails, and means for rotating the bed rail frame about its longitudinal axis.

16. In a motor handling machine, a post, a frame adjustable therealong, clamping means for holding the frame to the post in adjusted positions, and a bed rail frame mounted to rotate on the first-named frame and provided with substantially parallel rails each fast at one end to the bed rail frame, whereby to provide a motor-carrying frame open at the end remote from the post.

17. In a motor handling machine, a bed rail frame comprising a double-ended rocker arm, substantially parallel rails each fast at one end to and projecting from a respective end portion of the rocker arm, whereby to provide a frame with the end remote from the rocker arm open, a pair of carrying devices on each of the rails for supporting a motor, means for rotating the rocker arm and parts carried thereby, and adjustable centering devices on the rocker arm.

18. In a motor handling machine, a bed rail frame comprising a double-ended rocker arm, substantially parallel rails each fast at one end to and projecting from a respective end portion of the rocker arm, whereby to provide a frame with the end remote from the rocker arm open, carrying devices on the rails for supporting a motor, means for rotating the rocker arm and parts carried thereby, and adjustable centering devices on the rocker arm, said centering devices being located midway between the rails and movable in a plane perpendicular to the plane of the parallel arms.

19. A portable motor handling machine comprising a truck, a post erected thereon, and a carrier for the motor having means for securing it to the post at different heights and means for imparting rotative movements to the carrier.

20. In a motor handling machine, a truck, a post erected thereon, a frame on the post, a double ended rocker arm carried by the frame and provided with a hollow neck mounted for rotation in the frame, gearing on the neck and frame for imparting rotative movements to the rock arm, bed rails carried by opposite ends of the rocker arm, and clamp devices carried by the rails for sustaining a motor.

In testimony, that we claim the foregoing as our own, we have hereto affixed our signatures.

CHARLES D. McCONNELL.
JOHN M. BRYSON.